UNITED STATES PATENT OFFICE.

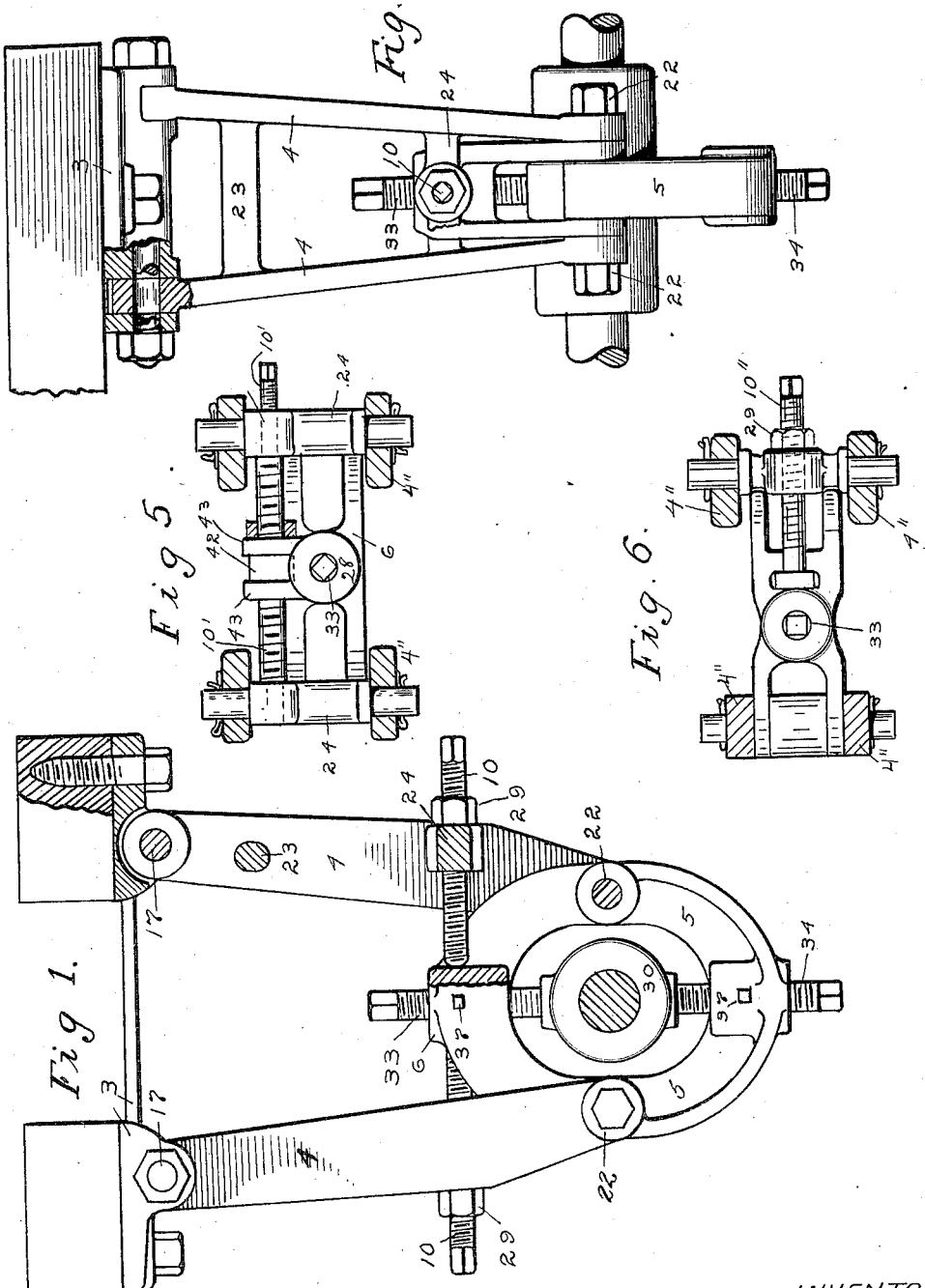

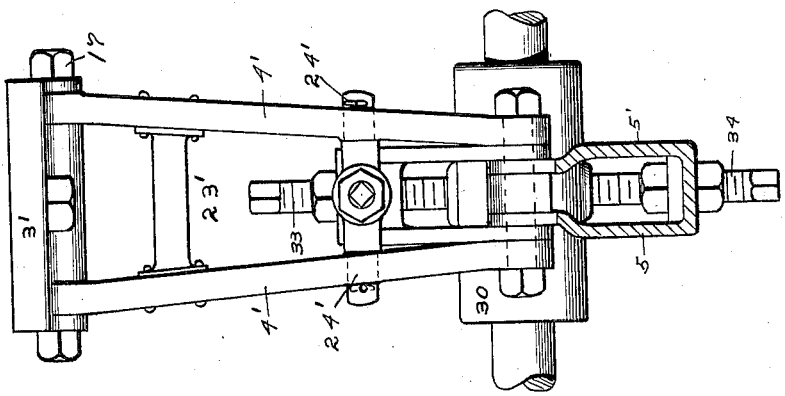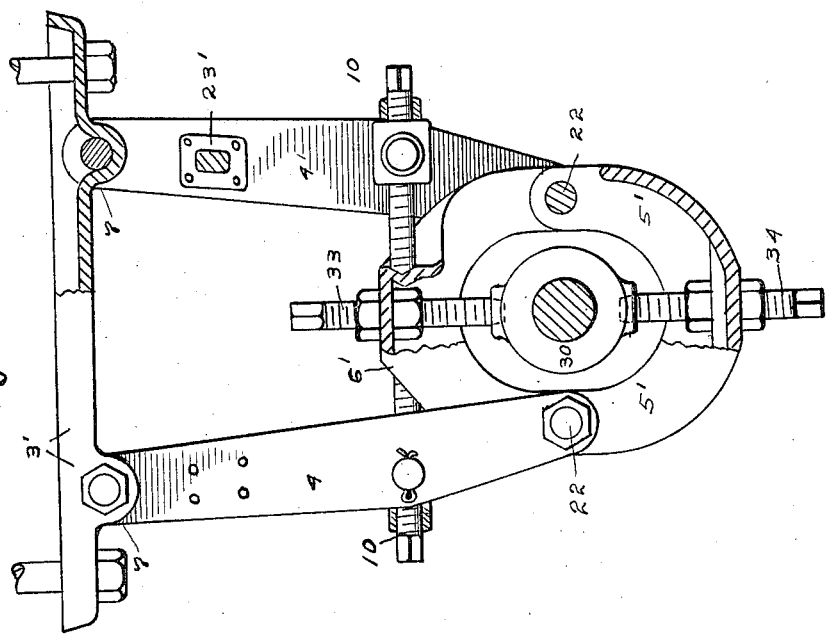

SILAS E. RYDER, OF TULSA, OKLAHOMA.

SHAFT-HANGER.

1,032,244.

Specification of Letters Patent. Patented July 9, 1912.

Application filed May 15, 1911. Serial No. 627,381.

*To all whom it may concern:*

Be it known that I, SILAS E. RYDER, a citizen of the United States, and a resident of Tulsa, in the county of Tulsa and State of Oklahoma, have invented an Improvement in Shaft-Hangers, of which the following is a specification.

My invention is an improvement in the class of shaft-hangers which are suspended from a ceiling plate or bracket; and the special feature of novelty is the adaptation of the hanger for adjustment of its movable members for the purpose of placing a shaft in different positions as required to secure alinement or parallelism between different shafts.

The invention is embodied in the construction, arrangement, and combination of parts hereinafter described, and illustrated in the accompanying drawings in which—

On Sheet 1, Figure 1 is in part a side view and in part a vertical section of my improved hanger. Fig. 2 is a similar view taken at right angles to Fig. 1. On Sheet 2, Figs. 3 and 4 are views corresponding to Figs. 1 and 2 and illustrating modifications. Figs. 5 and 6, Sheet 1, are horizontal sections illustrating further modifications.

I will first describe the hanger as illustrated in Figs. 1 and 2. Two pairs of legs 4 are pivoted to and suspended from a ceiling plate or bracket 3 by means of bolts 17 which pass through eyes formed on the upper ends of the legs and also through pendent lugs formed integral with the bracket. Each pair of legs 4 is connected transversely by webs or bars 23 and 24. To the lower ends of the pendent legs 4 are pivoted two semicircular yokes 5 and 6, the same being attached by means of transverse bolts 22. Screws 33 and 34 pass through threaded holes in the yokes and their inner ends enter sockets formed on the cylindrical shaft bearing 30. These screws are in vertical alinement, and by their adjustment the shaft may be raised or lowered as required to center it in the yokes. They may be locked in any adjustment by means of clamp-screws 37. Set-screws 10, having squared heads, pass through threaded openings in the webs or cross-bars 24 of the legs 4, and their inner ends bear against offsets or shoulders formed on the head of the yoke 6. It will now be apparent that, by rotating the screws 10, the yokes may be shifted laterally or to the right or left, in which case the legs 4 will swing correspondingly to the right or left, as may be required for adjusting the shaft bearing 30 in order to secure the required alinement or parallelism of the same with respect to other shafts. In other words, by the adjustment of the screws, the yokes are shifted along with the legs 4, there being, in fact, four pivotal points 17 and 22 which permit this movement. In order to lock the set-screws 10 in any required adjustment, jam nuts 29 are applied thereto as shown.

In Figs. 3 and 4, Sheet 2, I illustrate a bracket or ceiling plate 3' and legs 4' which are made of pressed steel. The legs are connected in pairs by cross bolts or webs 23' and 24' which may be bolted in place or secured by cotter-pins. The yokes 5' and 6' may also be struck up from steel plates. In other particulars, the construction, arrangement, and operation are practically similar to those indicated in Figs. 1 and 2.

Fig. 5, Sheet 1, illustrates a bearing in which a single set-screw or bolt 10' is employed, its end shoulders pressing against swivel bars 24 and having one end squared and projecting far enough to adapt it for application of a tool for rotating it. The hub 28 has a side recess that receives a nut 42, in which the screw 10' works. The nut being in contact with the sides of the recess presents oscillation or lateral movement of the lower part of the hanger except when the screw 10' is rotated. In Fig. 6, also, a single screw 10'' is employed. The central hub 28 has a side recess that receives the head of the screw-bolt. The construction, arrangement, and operation are practically the same as in Fig. 5. In both Figs. 5 and 6, the pendent legs which are shown in section are indicated by 4''.

What I claim is:—

1. A shaft-hanger, comprising a series of legs pivoted to and pendent from a support, yokes pivoted to and connecting the lower ends of such legs, a shaft bearing having supports in the said yokes, and means applied to the legs and yokes, whereby they may be shifted laterally and the shaft bearing thereby adjusted, substantially as described.

2. In a shaft-hanger of the type indicated, the combination with two pairs of pendent legs which are pivoted to an overhead support, and semicircular yokes which are pivoted together to the lower ends of the legs, of a shaft bearing and means for supporting it within the yokes, and a set-bolt passing through a threaded opening in a cross-bar connecting the legs and bearing against the upper one of the two yokes, whereby the relation of the yokes to the legs may be adjusted, as described.

3. In a shaft-hanger of the type indicated, the combination with two pairs of pendent legs which are pivoted to a suitable overhead support, and semicircular yokes arranged vertically and opposite each other and pivoted to the lower ends of the respective pairs of legs, of a shaft bearing supported adjustably within the yokes, and two screw-threaded bolts arranged opposite each other in alinement and passing through rigid connections between the pairs of legs, their inner ends bearing against opposite shoulders on the upper one of the two yokes, whereby the adjustment of the bolts in opposite directions moves the hanger laterally, as shown and described.

SILAS E. RYDER.

Witnesses:
T. D. EVANS,
J. J. HENDERSON.

---

Copies of this patent may be obtained for five cents each, by addressing the "Commissioner of Patents, Washington, D. C."